United States Patent
Hsieh et al.

(10) Patent No.: US 7,993,710 B2
(45) Date of Patent: Aug. 9, 2011

(54) LIQUID CRYSTALLINE MEDIUM AND METHOD FOR MANUFACTURING LIQUID CRYSTAL DISPLAY PANEL

(75) Inventors: Chung-Ching Hsieh, Hsin-Chu (TW); Yang-Chu Lin, Hsin-Chu (TW); Chia-Hsuan Pai, Hsin-Chu (TW); Te-Sheng Chen, Hsin-Chu (TW)

(73) Assignee: Au Optronincs Corp., Hsin-Chu (TW)

( * ) Notice: Subject to any disclaimer, the term of this patent is extended or adjusted under 35 U.S.C. 154(b) by 0 days.

(21) Appl. No.: 12/881,484

(22) Filed: Sep. 14, 2010

(65) Prior Publication Data

US 2011/0001919 A1   Jan. 6, 2011

Related U.S. Application Data

(62) Division of application No. 12/000,970, filed on Dec. 19, 2007, now Pat. No. 7,820,072.

(30) Foreign Application Priority Data

Mar. 30, 2007   (TW) ............... 96111467 A (51) Int. Cl.
*C09K 19/38* (2006.01)
*C09K 19/34* (2006.01)
*C09K 19/12* (2006.01)
*G02F 1/1333* (2006.01)

(52) U.S. Cl. ........... 428/1.1; 252/299.5; 252/299.63; 252/299.66; 349/183; 349/191

(58) Field of Classification Search ........... 428/1.1; 252/299.5, 299.63, 299.66; 349/183, 191
See application file for complete search history.

(56) References Cited

U.S. PATENT DOCUMENTS

| 6,056,893 | A | 5/2000 | Reiffenrath et al. |
| 6,620,467 | B2 | 9/2003 | Sudo et al. |
| 6,861,107 | B2 | 3/2005 | Klasen-Memmer et al. |
| 7,169,449 | B2 | 1/2007 | Nakanishi et al. |
| 7,820,072 | B2 * | 10/2010 | Hsieh et al. ........... 252/299.63 |
| 2003/0160210 | A1 | 8/2003 | Bremer et al. |
| 2004/0011996 | A1 | 1/2004 | Klasen-Memmer et al. |
| 2005/0116200 | A1 | 6/2005 | Nakanishi et al. |
| 2005/0136196 | A1 | 6/2005 | Kataoka |
| 2005/0264737 | A1 | 12/2005 | Kataoka et al. |
| 2006/0210725 | A1 | 9/2006 | Fujita et al. |

FOREIGN PATENT DOCUMENTS

| CN | 1303904 A | | 7/2001 |
| CN | 1336413 A | | 2/2002 |
| CN | 101045866 A | * | 10/2007 |
| DE | 3807872 | | 9/1989 |
| JP | 10251644 | | 9/1998 |

OTHER PUBLICATIONS

English abstract for CN 101045866, 2007.*

* cited by examiner

*Primary Examiner* — Shean C Wu
(74) *Attorney, Agent, or Firm* — Bacon & Thomas, PLLC (57) ABSTRACT

A liquid crystalline medium comprises a plurality of polymerizable monomers and a plurality of liquid crystal molecules. The liquid crystal molecules are selected from at least one of compounds 1, 2, 3, 4, 5, and 6.

[1]

[2]

"G¹", "G³" and "G⁵" are independently alkyl having 1 to 8 carbons or alkyenyl having 2 to 8 carbons. "G²" and "G⁶" are independently alkyl having 1 to 8 carbons or alkoxy having 1 to 7 carbons. "G⁴" is alkyl of 1 to 8 carbons, alkyenyl of 2 to 8 carbons or alkoxy of 1 to 7 carbons. "Z¹" is single bond, ethyl or methoxy. "Z²" is single bond, ethyl, methoxy, or caroboxyl. "Z³" is single bond, ethyl, difluoromethoxy, difluoropropoxy or ethyl carboxyl. "Z⁴" is single bond, ethyl, difluoromethoxy, or difluoropropoxy.

are independently 1,4-cyclohexylene or 1,4-phenylene. One of "E¹" and "E²" is fluorine, and the other is chlorine.

6 Claims, 1 Drawing Sheet

LIQUID CRYSTALLINE MEDIUM AND METHOD FOR MANUFACTURING LIQUID CRYSTAL DISPLAY PANEL

This application is a divisional application of co-pending application Ser. No. 12/000,970, filed on Dec. 19, 2007.

BACKGROUND OF THE INVENTION

1. Field of the Invention

The invention relates in general to a liquid crystalline medium, a liquid crystal display panel using the same, and a method for manufacturing a liquid crystal display panel, and more particularly to a liquid crystalline medium which is capable of being applied to a polymer-stabilizing alignment (PSA) technology, a liquid crystal display panel using the same, and a method for manufacturing a liquid crystal display panel.

2. Description of the Related Art

Polymer-stabilizing alignment (PSA) technology has been developed recently in the field of liquid crystal display panels. Polymerizable monomers are added into a liquid crystal layer, and would be arranged by the liquid crystal molecules when an electric field is applied. These arranged monomers are polymerized into alignment polymers under exposure of heat or irradiation of ultraviolet. The alignment polymers is for aligning liquid crystal molecules, especially when no electric field is applied to the LCD panel.

However, not all the liquid crystalline media are suitable for being applied to PSA technology. Therefore, it is very important to develop a liquid crystalline medium not only suitable for being applied to PSA technology but also having good optical performance of the liquid crystal display panel.

SUMMARY OF THE INVENTION

The invention is directed to a liquid crystalline medium, a liquid crystal display panel using the same and a method for manufacturing a liquid crystal display panel. The liquid crystalline medium of the present invention, including liquid crystal molecules and polymerizable monomers, is suitable for being applied to polymer-stabilizing alignment technology. The liquid crystal display panel comprising above mentioned liquid crystalline medium and manufactured by PSA technology has faster response speed.

According to the present invention, a liquid crystalline medium including several polymerizable monomers and several liquid crystal molecules is provided. The liquid crystal molecules are selected from at least one of compounds 1, 2, 3, 4, 5 and 6.

[1]

[2]

[3]

[4]

[5]

[6]

"$G^1$", "$G^3$" and "$G^5$" are independently alkyl having 1 to 8 carbons or alkyenyl having 2 to 8 carbons. "$G^2$" and "$G^6$" are independently alkyl having 1 to 8 carbons or alkoxy having 1 to 7 carbons. "$G^4$" is alkyl having 1 to 8 carbons, alkyenyl having 2 to 8 carbons or alkoxy having 1 to 7 carbons. "$Z^1$" is single bond, ethyl, or methoxy. "$Z^2$" is single bond, ethyl, methoxy or caroboxyl. "$Z^3$" is single bond, ethyl, difluoromethoxy, difluoropropoxy or ethyl carboxyl. "$Z^4$" is single bond, ethyl, difluoromethoxy or difluoropropoxy.

are independently 1,4-cyclohexylene or 1,4-phenylene. One of "$E^1$" and "$E^2$" is fluorine, and the other is chlorine.

According to the present invention, a method for manufacturing a liquid crystal display panel including following steps is provided. First, an upper substrate and a lower substrate are provided in a step (a). Next, a space between the upper substrate and a lower substrate is filled with the above-described liquid crystalline medium. Then, an electric field is applied to the upper substrate and the lower substrate, and an energy source is provided for polymerizing the polymerizable monomers into alignment polymers.

According to the present invention, a liquid crystal display panel including a lower substrate, an upper substrate and a liquid crystal layer between the upper substrate and the lower substrate is provided. The liquid crystal layer includes the above-described liquid crystal molecules and several alignment polymers. The alignment polymers are polymerized by the above-described polymerizable monomers and formed on at least one of the upper substrate and the lower substrate.

The invention will become apparent from the following detailed description of the preferred but non-limiting embodiments. The following description is made with reference to the accompanying drawings.

DETAILED DESCRIPTION OF THE INVENTION

The present invention provides a liquid crystalline medium including liquid crystal molecules and polymerizable monomers. Liquid crystal displays, comprising the liquid crystalline medium of the invention and manufactured by polymer-stabilizing alignment (PSA) technology, have shorter response time. The formulas and mixture ratio of the liquid crystal molecules and the polymerizable monomers in the liquid crystalline medium are illustrated first, and a method for manufacturing a liquid crystal display panel using the liquid crystalline medium of the present invention is illustrated later.

The liquid crystalline medium of the present invention includes numerous liquid crystal molecules and numerous polymerizable monomers. The liquid crystal molecules of the present invention are selected from at least one of compounds 1, 2, 3, 4, 5, and 6.

The compound 1 is represented as following formula.

[1]

The compound 2 is represented as following formula.

[2]

The compound 3 is represented as following formula.

[3]

The compound 4 is represented as following formula.

[4]

The compound 5 is represented as following formula.

[5]

The compound 6 is represented as following formula.

[6]

"$G^1$", "$G^3$" and "$G^5$" are independently alkyl having 1 to 8 carbons or alkyenyl having 2 to 8 carbons.

"$G^2$" and "$G^6$" are independently alkyl having 1 to 8 carbons or alkoxy having 1 to 7 carbons.

"$G^4$" is alkyl having 1 to 8 carbons, alkyenyl having 2 to 8 carbons or alkoxy having 1 to 7 carbons.

"$Z^1$" is single bond, ethyl (—$C_2H_4$—) or methoxy (—$CH_2O$—).

"$Z^2$" is single bond, ethyl (—$C_2H_4$—), methoxy (—$CH_2O$—) or caroboxyl (—COO—).

"$Z^3$" is single bond, ethyl (—$C_2H_4$—), difluoromethoxy (—$CF_2O$—), difluoropropoxy (—$OCF_2C_2H_4$—) or ethyl carboxyl (—$C_2H_4COO$—).

"$Z^4$" is single bond, ethyl (—$C_2H_4$—), difluoromethoxy (—$CF_2O$—) or difluoropropoxy (—$OCF_2C_2H_4$—).

are independently 1,4-cyclohexylene or 1,4-phenylene.

One of "$E^1$" and "$E^2$" is fluorine, and the other is chlorine.

In a preferred embodiment, the liquid crystal molecules in the liquid crystalline medium of the present invention include liquid crystal molecules including chlorine. The liquid crystal molecules preferably include at least three compounds. The liquid crystal molecules preferably include at least one selected from the compounds 1 or 2, at least one selected from the compounds 3 or 4, and at least one selected from the compounds 5 or 6. For example, the liquid crystal molecules include at least one of compounds selected from the group consisting of a compound [1-1] belonging to the compound 1 and compounds [2-2], [2-3], [2-4] and [2-5] belonging to the compound 2.

[1-1]

-continued

[2-1]

[2-2]

[2-3]

[2-4]

[2-5]

The compound [1-1] belongs to the compound 1. In the compound [1-1], "$G^1$" is propyl (alkyl having 3 carbons), and "$G^2$" is ethyloxy (alkoxy having 2 carbons). "$Z^1$" is single bond. "$E^1$" is fluorine. "$E^2$" is chlorine.

The compounds [2-1], [2-2], [2-3], [2-4] and [2-5] belong to the compound 2. "$G^1$" of the compound [2-1] is ethyl (alkyl having 2 carbons). "$G^2$" of the compound [2-1] is ethyloxy (alkoxy having 2 carbons). "$Z^1$" of the compound [2-1] is single bond. "$E^1$" of the compound [2-1] is fluorine. "$E^2$" of the compound [2-1] is chlorine.

of the compound [2-1] is 1,4-cyclohexylene. In the compound [2-2], "$G^1$" is propyl (alkyl having 3 carbons), and the rest of the functional groups in the compound [2-2] are the same as those in the compound [2-1]. In the compound [2-3], is 1,4-phenylene, and the rest of the functional groups in the compound [2-3] are the same as those in the compound [2-2]. In the compound [2-4], "$G^1$" is butyl (alkyl having 4 carbons), and the rest of the functional groups in the compound [2-4] are the same as those in the compound [2-1]. In the compound

[2-5], "$G^1$" is pentyl (alkyl having 5 carbons), and the rest of the functional groups in the compound [2-5] are the same as those in the compound [2-1].

The liquid crystal molecules include at least one of compounds selected from the group consisting compounds [3-1], [3-2] and [3-3] belonging to the compound 3 and compounds [4-1] and [4-2] belonging to the compound 4.

[3-1]

[3-2]

[3-3]

[4-1]

[4-2]

The compounds [3-1], [3-2] and [3-3] belong to the compound 3. "$G^3$" of the compound [3-1] is propyl (alkyl having 3 carbons). "$G^4$" of the compound [3-1] is ethyloxy (alkoxy having 2 carbons).

of the compound [3-1] is 1,4-phenylene. In the compound [3-2], "$G^3$" is butyl (alkyl having 4 carbons). "$G^4$" of the compound [3-2] is propyl (alkyl having 3 carbons).

of the compound [3-2] is 1,4-cyclohexylene. "$G^3$" of the compound [3-3] is pentyl (alkyl having 5 carbons). In the compound [3-3], "$G^4$" is ethyl (alkyl having 2 carbons), and the rest of the functional groups in the compound [3-3] are the same as those in the compound [3-2].

The compounds [4-1] and [4-2] belong to the compound 4. "$G^3$" of the compound [4-1] is propyl (alkyl having 3 carbons). "$G^4$" of the compound [4-1] is methyl (alkyl having 1 carbon).

of the compound [4-1] is 1,4-cyclohexylene. "$Z^2$" of the compound [4-1] is single bond. In the compound [4-2], "$G^4$" is methoxy (alkoxy having 1 carbon), and the rest of the functional groups of the compound [4-2] are the same as those of the compound [4-1].

The liquid crystal molecules further include at least one selected from the group consisting of compounds [5-1] and [5-2] belonging to the compound 5 and a compound [6-1] belonging to the compound 6.

[5-1]

[5-2]

[6-1]

The compounds [5-1] and [5-2] belong to the compound 5. "$G^5$" of the compound [5-1] is propyl (alkyl having 3 carbons). "$G^6$" of the compound [5-1] is ethyloxy (alkoxy having 2 carbons).

of the compound [5-1] is 1,4-cyclohexylene. "$Z^3$" of the compound [5-1] is ethyl. In the compound [5-2], "$G^5$" is pentyl (alkyl having 5 carbons), and the rest of the functional groups of the compound [5-2] are the same as those of the compound [5-1].

The compound [6-1] belongs to the compound 6. "$G^5$" of the compound [6-1] is pentyl (alkyl having 5 carbons). "$G^6$" of the compound [6-1] is ethyloxy (alkoxy having 2 carbons).

of the compound [6-1] is 1,4-cyclohexylene. "$Z^4$" of the compound [6-1] is single bond.

The polymerizable monomers of the liquid crystalline medium of the present invention preferably are selected from one of compounds I, II, III, IV and V. The compound I is represented as following formula.

$w \geq 0$;

The compound II is represented as following formula.

$w \geq 0$;

The compound III is represented as following formula.

$w \geq 0$;

The compound IV is represented as following formula.

$w \geq 0$;

The compound V is represented as following formula.

$n \geq 1$;

"R" is hydrogen, fluorine, chlorine, cyano group (—CN), thiocyanato (—SCN), pentafluoro-sulfanyl (—$SF_5$), nitrite (—$NO_2$), straight chain or branched chain alkyl group or a "$X_2$-$(Sp_2)_v$-$P_2$" group, in which $v \geq 0$. In the above-described straight chain or branched chain alkyl group, one or two nonadjacent —$CH_2$— groups can be replaced by oxygen, sulfur, vinylene (—CH═CH—), carbonyl (C═O), caroboxyl (—COO—), carbothio (S—CO—, —CO—S—) or alkyne.

"$X^1$" and "$X^2$" are independently oxygen, sulfur, methyoxy (—OCH$_2$—), carbonyl (C═O), caroboxyl (—COO—), carbamoyl (—CO—N$^0$R—, —N$^0$R—CO—), methylthio (—CH$_2$S—, —SCH$_2$—), ethenylcarbonyl (—CH═CH—COO—), carbonylethenyl (—COO—CH═CH—) or single bond.

"$Sp_1$" and "$Sp_2$" are independently a spacer group or single bond.

"$L_m$" and "$L_n$" are hydrogen, fluorine, chlorine, cyano group, alkyl, alkylcarbonyl, alkoxycarbonyl, or alkylcarbonyloxy having 1 to 7 carbons respectively. $m \geq 1$ and $n \geq 1$. One or more hydrogen atoms in the above-described alkylcarbonyl can be replaced by fluorine or chlorine.

"$Q_1$" and "$Q_2$" are independently oxygen, sulfur, (carbonyl, C═O), caroboxyl (—COO—), methyoxy (—OCH$_2$—), methylthio (—CH$_2$S—), ethenylcarbonyl (—CH═CH—COO—), carbonylethenyl (—COO—CH═CH—), difluoromethoxy (—CF$_2$O—, —OCF$_2$—), difluoro methylthio (—CF$_2$S—, —SCF$_2$—), ethyl (—C$_2$H$_4$—), difluoroethane (—CF$_2$CH$_2$—, —CH$_2$CF$_2$—), tetrafluoroethane (—CF$_2$CF$_2$—), vinylene (—CH═CH—), difluoroethenylene (—CF═CF—), ethynyl (—C≡C—) or single bond.

"$P_1$" and "$P_2$" are polymerizable groups respectively. The polymerizable groups can be selected from at least one of groups VI, VII, VIII. IX and X.

The formula of the group VI is shown as follow.

[VI]

The formula of the group VII is shown as follow.

[VII]

The group VIII is pyrrole-2,5-dione, and the formula of the group VIII is shown as follow.

[VIII]

The formula of the group IX is shown as follow.

[IX]

The formula of the group X is shown as follow.

[X]

"U", "T", "Y" and "M" are independently selected from hydrogen, methyl, fluorine, trifluoromethyl (—CF$_3$) and phenyl.

The above-described polymerizable monomers can be following compounds [P-1], [P-2], [P-3] and [P-4].

[P-1]

[P-2]

[P-3]

[P-4]

The polymerizable monomers [P-1] and [P-2] belong to the compound II. "$L_m$" of the polymerizable monomer [P-1] is hydrogen. m=4. w=0. "R" of the polymerizable monomer [P-1] is X$_2$-(Sp$_2$)$_v$-P$_2$ group. v=0. "$X_1$" and "$X_2$" of the polymerizable monomer [P-1] are single bond. "$P_1$" and "$P_2$" of the polymerizable monomer [P-1] are the group IX. "Y" of the polymerizable monomer [P-1] is methyl. "$L_m$" of the polymerizable monomer [P-2] is hydrogen. m=4. w=0 In addition, "R" of the polymerizable monomer [P-2] is X$_2$-(Sp$_2$)$_v$-P$_2$ group. v=0. "$X_1$" and "$X_2$" of the polymerizable monomer [P-2] are oxygen. "$P_1$" and "$P_2$" of the polymerizable monomer [P-2] are the group X. "M" of the polymerizable monomer [P-2] is hydrogen.

The polymerizable monomer [P-3] belongs to the compound III. "$L_m$" of the polymerizable monomer [P-3] is hydrogen. m=3. w=0. "R" of the polymerizable monomer [P-3] is $X_2$-$(Sp_2)_v$-$P_2$ group. v=0. "$X_1$" and "$X_2$" of the polymerizable monomer [P-3] are single bond. "$P_1$" and "$P_2$" of the polymerizable monomer [P-3] are group IX. "Y" of the polymerizable monomer [P-3] is methyl.

The polymerizable monomer [P-4] belongs to the compound IV. "$L_m$" and "$L_n$" of the polymerizable monomer [P-4] are hydrogen. m=3. n=2. w=0. "R" of the polymerizable monomer [P-4] is $X_2$-$(Sp_2)_v$-$P_2$ group. v=0. "$X_1$" and "$X_2$" of the polymerizable monomer [P-4] are single bond. "$P_1$" and "$P_2$" of the polymerizable monomer [P-4] are the group IX. "Y" of the polymerizable monomer [P-4] is methyl.

As to the mixture ratio of the liquid crystal molecules and the polymerizable monomers, the weight of the polymerizable monomers is about 0.1% to 10% of the total weight of the liquid crystalline medium. The weight of the liquid crystal molecules is about 99.9% to 90% of the total weight of the liquid crystalline medium. Preferably, the weight of the polymerizable monomers is about 0.3% of the total weight of the liquid crystalline medium, and the weight of the liquid crystal molecules is about 99.7% of the total weight of the liquid crystalline medium. More preferably, the weight of the compounds selected from the compound 1 or 2 is about 30% of the total weight of the liquid crystal molecules. The weight of the compounds selected from the compound 3 or 4 is about 10% to 50% of the total weight of the liquid crystal molecules. The weight of the compounds selected from the compound 5 or 6 is about 20% to 60% of the total weight of the liquid crystal molecules.

Moreover, the liquid crystalline medium further includes an initiator whose weight is about 0% to 0.002% of the total weight of the liquid crystalline medium, for speeding up the polymerization reactions of the monomers.

A method for manufacturing a liquid crystal display panel according to the present invention includes following steps. First, an upper substrate and a lower substrate are provided in a step (a). Next, the space between the upper substrate and the lower substrate is filled with the above-described liquid crystalline medium. Then, voltage is applied to the upper substrate and the lower substrate, and an energy source is provided in a step (c). As a result, the polymerizable monomers are polymerized into alignment polymers. For example, the energy source is an ultraviolet source, a heat source or a combination thereof.

A liquid crystal display panel manufactured by above-described method includes the upper substrate, the lower substrate and a liquid crystal layer disposed between the upper substrate and the lower substrate. The liquid crystal layer includes the above-described liquid crystal molecules and alignment polymers. The alignment polymers are polymerized by the polymerizable monomers through polymerization reactions and formed on at least one of the upper substrate and the lower substrate. The alignment polymers are for aligning the liquid crystal molecules or enabling the liquid crystal molecules to form pre-tilt angles.

A preferred embodiment is provided as follow for illustrating the composition, mixture ratio and manufacturing conditions of the liquid crystalline medium. And then, the properties of the liquid crystalline medium and the optical properties of the liquid crystal display panel are further analyzed.

The liquid crystalline medium of the preferred embodiment of the present invention includes the polymerizable monomers and the liquid crystal molecules including chlorine. The liquid crystalline medium includes 99.7% liquid crystal molecules and 0.3% polymerizable monomers. The liquid crystal molecules in the liquid crystalline medium include the compounds [2-1], [2-2], [2-3], [2-4] and [2-5] selected from the compound 2, the compounds [3-1], [3-2], [3-3], [4-1] and [4-2] selected from the compound 3 or 4, and the compounds [5-1] and [5-2] selected from the compound 5. The polymerizable monomers include the compound [P-1].

A control group (i.e. another liquid crystal medium comprising the same polymerizable monomers yet the liquid crystal molecules without chlorine) is used as a standard for comparison.

After analyzing the properties of the liquid crystalline medium of the present embodiment and the control group, it is found that these two liquid crystalline media are similar in the optical anisotropy, dielectric anisotropy, nematic-isotropic phase-transition temperature (Tni), etc. However, rotational viscosity of the liquid crystalline medium of the present embodiment is only 77.4 mPa·s, which is far below the rotational viscosity of the control group, 141 mPa·s. Therefore, the liquid crystalline medium of the present embodiment has less resistance when rotating, which can reduce the response time.

Then, the space between the two substrates is filled with the above-described liquid crystalline medium, and a voltage of 6.4 J is applied between the two substrates. After the liquid crystal molecules and the polymerizable monomers are arranged according to the electric field, an ultraviolet source is used for polymerizing the monomers into alignment polymers. The liquid crystal display panel of the present embodiment is accomplished accordingly. In addition, the liquid crystal display pane of the control group is manufactured by the same method, except for that the liquid crystalline medium has no chlorine.

Optical performance experiments are performed on the liquid crystal display panels of the present embodiment and the control group.

Figure 1:
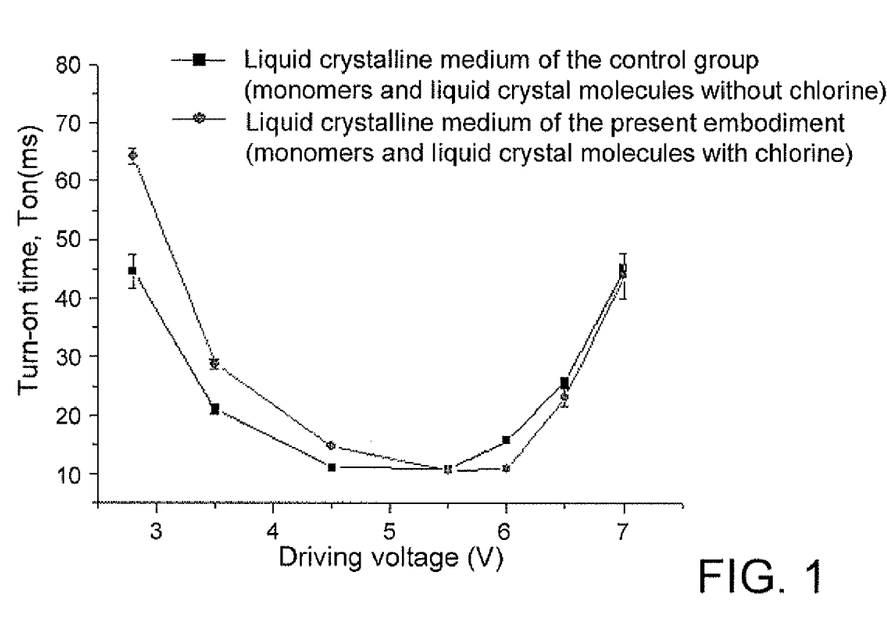
FIG. 1 is a comparison chart illustrating driving voltage versus turn-on time ($T_{on}$) of a liquid crystal display panel according to a preferred embodiment of the present invention.
Figure 2:
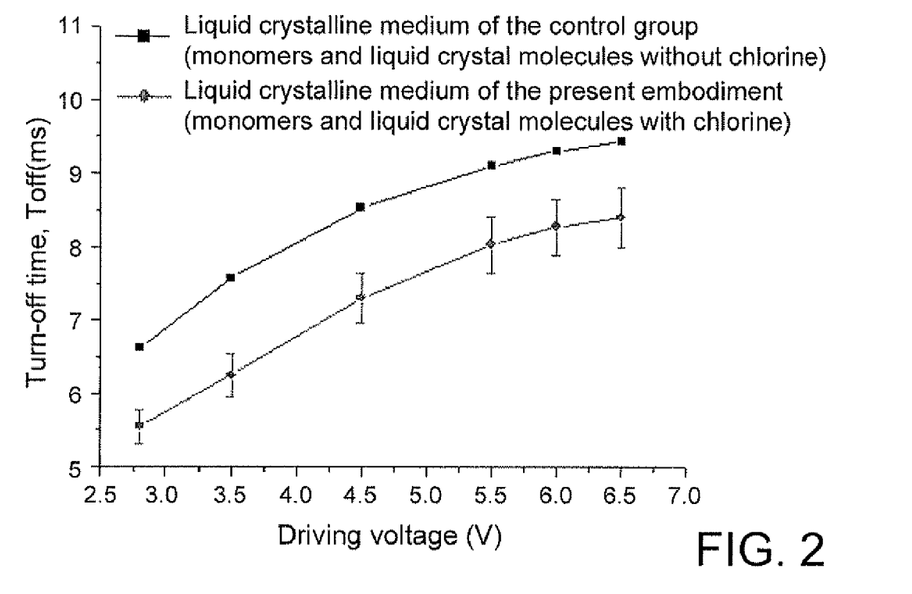
FIG. 2 is a comparison chart illustrating driving voltage versus turn-off time ($T_{off}$) of the liquid crystal display panel according to the preferred embodiment of the present invention.

After different values of voltage are applied to the liquid crystal display panels, the turn-on time ($T_{on}$), which is time that the liquid crystal molecules need to rotate from the initial position to the predetermined position, is measured and illustrated in FIG. 1. Furthermore, after stop applying voltage, the turn-off time ($T_{off}$), that is time the liquid crystal molecules need to return to the original position, is measured as well and illustrated in FIG. 2.

Please refer to FIG. 1. When the voltage is equal to 5.5V, the response time (i.e. $T_{on}$) that the liquid crystal molecules in the liquid crystal display panel of the present embodiment need to rotate from the initial position to the predetermined position is equal to that of the control group: When the voltage is greater than 5.5V, the response time (i.e. $T_{on}$) that the liquid crystal molecules in the liquid crystal display panel of the present embodiment need to rotate from the initial position to the predetermined position is much less than that of the control group. Please refer to FIG. 2. No matter how much voltage is applied, the response time (i.e. $T_{off}$) that the liquid crystal molecules in the liquid crystal display panel of the present embodiment need to rotate back to the original position is less than that of the control group. When the liquid crystal display panel of the control group is driven by the voltage of 5.5V, the turn-on time ($T_{on}$) is 10.8 ms, and the turn-off time ($T_{off}$) is 9.2 ms. When the liquid crystal display panel of the present embodiment is driven by the voltage of 5.5V, the turn-on time ($T_{on}$) is 10.8 ms as well, but the turn-off time ($T_{off}$) is only 7.8 ms.

Furthermore, the contrast ratio of the liquid crystal display panel of the preferred embodiment is 3443, which is similar to 3609, the contrast value of the liquid crystal display panel of the control group. Therefore, when the optical properties remain the same, the liquid crystal display panel of the present embodiment has shorter response time. The optical performance of the liquid crystal panel is improved effectively.

In the liquid crystalline medium, the liquid crystal display panel using the same, and the method for manufacturing the liquid crystal display panel according to the above embodiment, the polymerizable monomers and the liquid crystal molecule including chlorine have lower viscosity. Therefore, the resistance that the liquid crystal molecules have when rotating is less, and the response time is shorter. It is proofed from the above embodiment that the liquid crystalline medium of the present embodiment has much lower viscosity than the conventional liquid crystalline medium. The liquid crystal panel using the liquid crystalline of the present embodiment has the same optical properties but shorter response time. Therefore, the optical performance of the liquid crystal display panel of the present embodiment is better.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method for manufacturing a liquid crystal display panel, the method comprising:
providing an upper substrate and a lower substrate;
filling a space between the upper substrate and the lower substrate with a liquid crystalline medium, the liquid crystalline medium comprising a plurality of liquid crystal molecules and a plurality of polymerizable monomers, the liquid crystal molecules selected from at least one of compounds 1 and 2, the compound 1 represented as formula:

[1]

the compound 2 represented as formula:

[2]

and
selected from at least one of compounds 3, 4, 5 and 6, the compound 3 represented as formula:

[3]

the compound 4 represented as formula:

[4]

the compound 5 represented as formula:

[5]

and
the compound 6 represented as formula:

[6]

wherein "$G^1$", "$G^3$" and "$G^5$" are independently alkyl having 1 to 8 carbons or alkyenyl having 2 to 8 carbons,
"$G^2$" and "$G^6$" are independently alkyl having 1 to 8 carbons or alkoxy having 1 to 7 carbons,
"$G^4$" is alkyl having 1 to 8 carbons, alkyenyl having 2 to 8 carbons or alkoxy having 1 to 7 carbons,
"$Z^1$" is single bond, ethyl (—$C_2H_4$—) or methoxy (—$CH_2O$—),
"$Z^2$" is single bond, ethyl (—$C_2H_4$—), methoxy (—$CH_2O$—) or caroboxyl (—COO—),
"$Z^3$" is single bond, ethyl (—$C_2H_4$—), difluoromethoxy (—$CF_2O$—), difluoropropoxy (—$OCF_2C_2H_4$—) or ethyl carboxyl (—$C_2H_4COO$—),
"$Z^4$" is single bond, ethyl (—$C_2H_4$—), difluoromethoxy (—$CF_2O$—) or difluoropropoxy (—$OCF_2C_2H_4$—), are independently 1,4-cyclohexylene or 1,4-phenylene, and one of "$E^1$" and "$E^2$" is fluorine, and the other is chlorine; and
applying voltage to the upper substrate and the lower substrate, and providing an energy source for polymerizing the polymerizable monomers into an alignment polymer.

2. The method according to claim 1, wherein the polymerizable monomers are selected from at least one of compounds I, II, III, IV and V the compound I represented as formula:

[I]

w ≧ 0;

the compound II represented as formula:

[II]

w ≧ 0;

the compound III represented as formula:

[III]

w ≧ 0;

the compound IV represented as formula:

[IV]

w ≧ 0;

the compound V represented as formula:

[V]

n ≧ 1;

wherein "R" is hydrogen, fluorine, chlorine, cyano group (—CN), thiocyanato (—SCN), pentafluoro-sulfanyl (—SF$_5$), nitrite (—NO$_2$), straight chain or branched chain alkyl group having 1 to 12 carbons or a "X$_2$-(Sp$_2$)$_v$-P$_2$" group, wherein v ≧ 0;

"X$^1$" and "X$^2$" are independently oxygen, sulfur, methyoxy (OCH$_2$—), carbonyl (C═O), caroboxyl (—COO—), carbamoyl (—CO—N0R—, —N$^0$R—CO—), methylthio (—CH$_2$S—, —SCH$_2$—), ethenylcarbonyl (—CH═CH—COO—), carbonylethenyl (—COO—CH═CH—) or single bond,

"Sp$_1$" and "Sp$_2$" are independently a spacer group or single bond,

"L$_m$" and "L$_n$" are hydrogen, fluorine, chlorine, cyano group, alkyl, alkylcarbonyl, alkoxycarbonyl, or alkylcarbonyloxy having 1 to 7 carbons respectively; wherein m ≧ 1 and n ≧ 1, "Q$_1$" and "Q$_2$" are independently oxygen, sulfur, (carbonyl, C═O), caroboxyl (—COO—), methyoxy (—OCH$_2$—), methylthio (—CH$_2$S—), ethenylcarbonyl (—CH═CH—COO—), carbonylethenyl (—COO—CH═CH—), difluoromethoxy (—CF$_2$O—, —OCF$_2$—), difluoro methylthio (—CF$_2$S, —SCF$_2$—), ethyl (—C$_2$H$_4$—), difluoroethane (—CF$_2$CH$_2$—, —CH$_2$CF$_2$—), tetrafluoroethane (—CF$_2$CF$_2$—), vinylene (—CH═CH—), difluoroethenylene (—CF═CF—), ethynyl (—C≡C—) or single bond, and

"P$_1$" and "P$_2$" are two polymerizable groups respectively.

3. The method according to claim 1, wherein the polymerizable group is selected from one of groups VI, VII, VIII, IX and X, the group VI represented as formula:

[VI]

"U" selected from hydrogen, methyl, fluorine, trifluoromethyl (—CF$_3$) and phenyl, the group VII represented as formula:

[VII]

"T" selected from hydrogen, methyl, fluorine, trifluoromethyl (—CF$_3$) and phenyl, the group VIII being pyrrole-2,5-dione, represented as formula:

[VIII]

the group IX represented as formula:

[IX]

"Y" selected from hydrogen, methyl, fluorine, trifluoromethyl (—CF$_3$) and phenyl, and the group X represented as formula:

[X]

"M" selected from hydrogen, methyl, fluorine, trifluoromethyl (—CF$_3$) and phenyl.

4. The method according to claim 1, wherein the weight of the polymerizable monomers is about 0.3% of the total weight of the liquid crystalline medium.

5. The method according to claim 1, wherein the liquid crystal molecules comprise at least three compounds, the liquid crystal molecules comprising at least one selected from the compounds 1 or 2 and the weight thereof being about 30% to 70% of the total weight of the liquid crystal molecules, at least one selected from the compounds 3 or 4 and the weight thereof being about 10% to 50% of the total weight of the liquid crystal molecules, and at least one selected from the compounds 5 or 6 and the weight thereof being about 20% to 60% of the total weight of the liquid crystal molecules.

6. The method according to claim 1, wherein the liquid crystalline medium further comprises an initiator whose weight is substantially 0% to 0.002% of the total weight of the liquid crystalline medium, for polymerizing the polymerizable monomers into the alignment polymers faster.

* * * * *